United States Patent

[11] 3,570,503

[72] Inventor Alfred E. DeBoliac
 P.O. Box 947, Buena Vista Station, Miami, Fla. 33137
[21] Appl. No. 776,081
[22] Filed Nov. 15, 1968
[45] Patented Mar. 16, 1971

[54] HIGH-LIFT UNIT FOR RAPID SERVICING OF AIRCRAFT-INSTALLED LAVATORIES
 12 Claims, 5 Drawing Figs.
[52] U.S. Cl. .................................................. 134/58, 4/1,
 134/98, 134/101, 134/103, 134/115, 134/168, 141/91, 222/178
[51] Int. Cl. ..................................................... B08b 3/08, B08b 9/08
[50] Field of Search .......................................... 134/58, 98, 100, 101, 103, 123, 167, 168, 169; 4/1, 8, 10; 141/89, 91, 92, 231; 184/1.5; 222/(inquired); 137/(inquired); 134/115

[56] References Cited
UNITED STATES PATENTS

| | | | |
|---|---|---|---|
| 2,240,227 | 4/1941 | Saussure | 134/168 |
| 2,531,001 | 11/1950 | Short | 222/176 |
| 3,378,025 | 4/1968 | Hilde | 137/205 |
| 3,439,372 | 4/1969 | Collier | 15/50 |
| 3,460,177 | 8/1969 | Rinehart et al. | 15/21(C.O) |
| 2,787,278 | 4/1957 | Mitchell | 137/351X |

FOREIGN PATENTS

| | | | |
|---|---|---|---|
| 454,487 | 2/1949 | Canada | 222/176 |

Primary Examiner—Daniel Blum
Attorney—Stevens, Davis, Miller and Mosher

ABSTRACT: Self-contained mobile lavatory servicing and sanitation unit which expedites the cleaning of aircraft lavatory waste receptacles through a system of operably connected tanks and apparatus providing means for removal and carrying away of wastes from the aircraft and cooperating means for water-flushing of the receptacles and for transferring the wastes and the flushed material into the mobile unit, and cooperating means for chemically sanitizing and deodorizing the receptacles together with means for emptying of the removed wastes from the mobile unit and means for flushing, sanitizing and deodorizing the waste removal portion of the unit after emptying, the unit being vehicle supported and adapted to have major portions elevator positionable to closely adjacent the cleanout plumbing connections of the aircraft and provided with work stations having means for supporting an operator in an elevated position on the apparatus for operating the controls for the unit and the aircraft plumbing connections so that rapid, economic servicing of sanitary facilities on the aircraft can be accomplished in a unitary operation while the aircraft is positioned on the runway.

Patented March 16, 1971

INVENTOR
ALFRED E. DeBOLIAC

BY Stevens, Davis, Miller & Mosher
ATTORNEYS

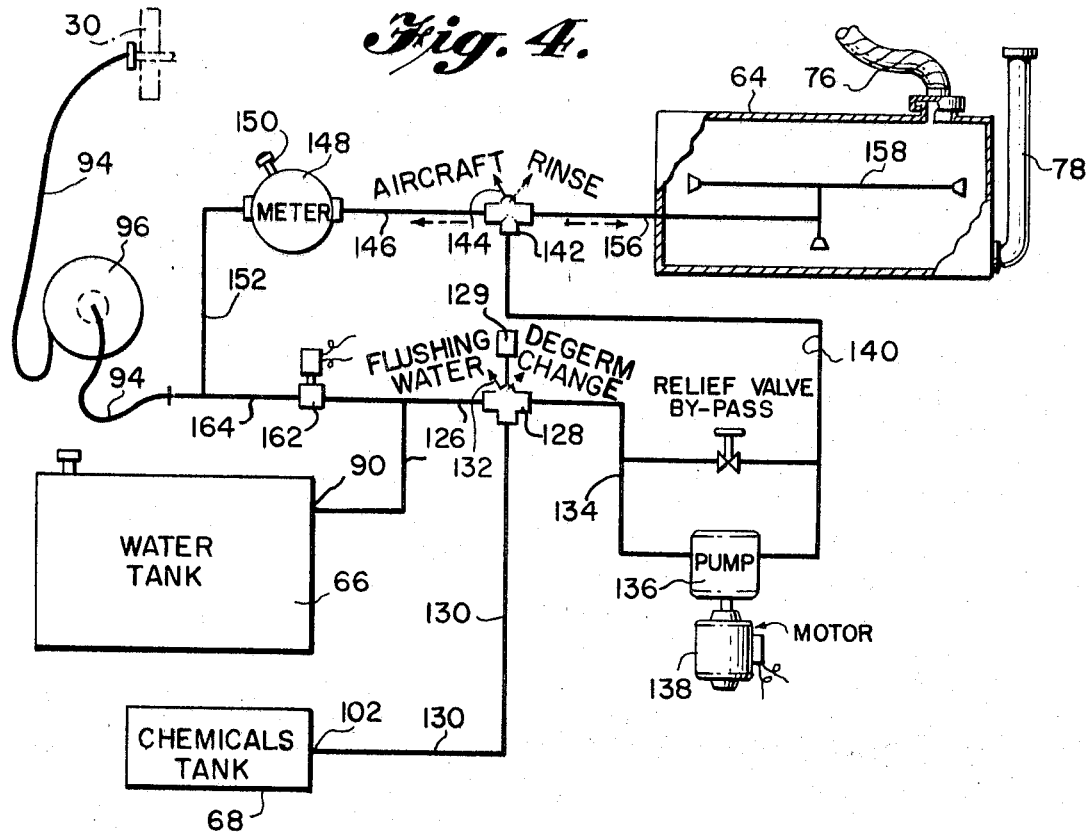
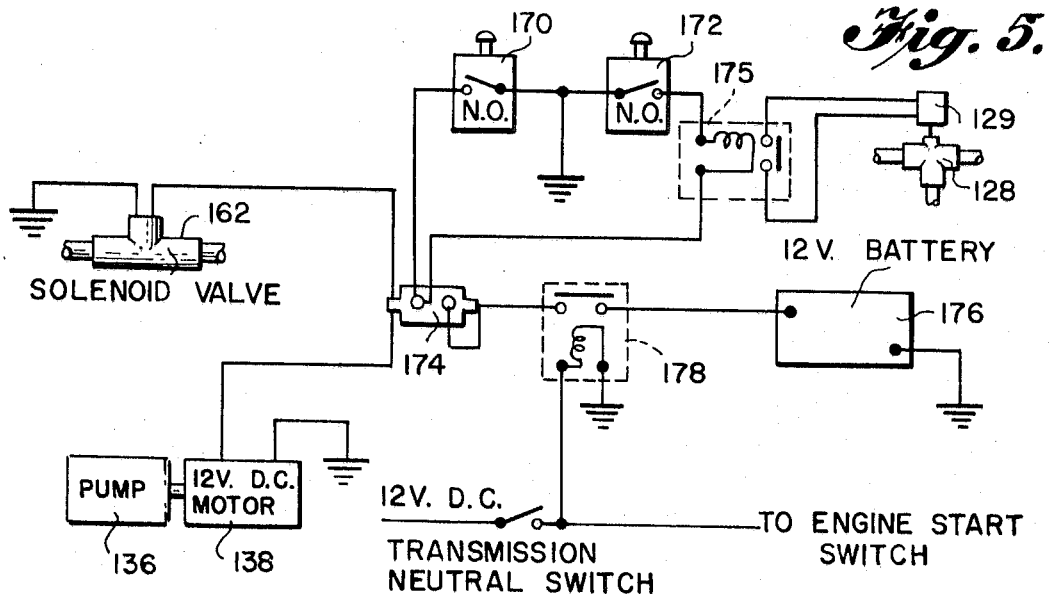

3,570,503

HIGH-LIFT UNIT FOR RAPID SERVICING OF AIRCRAFT-INSTALLED LAVATORIES

BACKGROUND OF THE INVENTION

1. Field of the Invention

Waste tank servicing units for portable lavatories and in particular to a mobile system and apparatus for rapid and economic servicing of the lavatory waste storage receptacles of aircraft. As used herein, the term "lavatory" is intended to include the sanitary facilities commonly associated with portable rest room facilities such as toilets and sinks for washing of hands and their associated plumbing.

2. Description of the Prior Art

Servicing of portable lavatories which must be periodically emptied and made fresh for continued use has heretofore been accomplished in number of ways, one example of which is shown in U.S. Pat. to Hilde, Jr., No. 3,378,025, which discloses a mobile system for evacuating and recharging portable commodes. Servicing of aircraft-installed lavatories is commonly done by attaching an emptying hose to the aircraft lavatory plumbing connections and leading the hose to a disposal tank for dumping and, after emptying, a chemical charge may be introduced into the lavatory waste receptacle. This has involved moving the airplane to a point of waste disposal and providing ladder equipment for personnel to reach the usually elevated plumbing connection on the aircraft, and separate equipment to charge the receptacle with chemicals. This has involved a considerable amount of operator lost motion in attending the aircraft and disposal point plumbing connections and accomplishing the various functions necessary to service the lavatory waste. With the increasingly high rate of continuous aircraft usage brought about by the tremendous increase in commercial flight activity and the demand for keeping aircraft in service, particularly when rapid turnaround and short stopovers of the commercially scheduled jet airplanes occur, it is necessary that the lavatories be serviced as speedily as possible and, of course, with a minimum of personnel.

SUMMARY OF THE INVENTION

The preset present invention contemplates a unit for servicing of aircraft lavatory waste storage receptacles by providing a laterally and vertically mobile cleaning fluids supply and control system having a waste removal and cleaning apparatus constructed of an operably connected assembly of tanks and associated equipment which is interconnected by fluid flow piping or conduits, and which has provision for elevating an operator together with the apparatus and controls therefor, into a position closely adjacent to the plumbing connections installed on the aircraft, whereby a single operator can accomplish semiautomatically a complete servicing of a lavatory waste storage receptacle and empty, flush, and sanitize-deodorize by charging water to receptacle with chemicals, from a position at once in close proximity to both the aircraft plumbing connections and the tank system, and thereafter empty, rinse and sanitize the assembly's waste receiving tank for an operator position on the apparatus.

The mobile lavatory servicing unit of this invention provides cleaning apparatus including a waste receiving tank means for removing and carrying away the wastes from the aircraft by transferring the wastes to the servicing unit through a waste removal conduit or tube. The unit also is provided with individual tank means for separately containing supplies of flushing water and deodorant-detergent chemicals for degerming, which can be fed into the water as it is supplied from its tank so that either flushing water or water and chemicals can be selectively and sequentially connected by a conduit hose to the lavatory waste storage receptacle on the aircraft for flushing out and charging the waste storage receptacle or tank to place the aircraft lavatory in fresh operating condition.

After the aircraft lavatory has been serviced, the cleaning apparatus is returned to ground position and the vehicle is moved to a waste collection and disposal area where the operator discharges the waste collected from the aircraft and flushes out the waste receiving tank with water from the flushing tank and if necessary, additionally cleanses the waste tank with water mixed with chemicals from the chemicals tank. Water and chemicals are recharged as necessary.

It will be appreciated that the tanks, receptacle, and other apparatus are combined so that the cleaning and sanitizing procedure of this invention can be rapidly conducted by a single operator by movement about the unit and through the manipulation of manual and automatic controls which may be provided at strategic positions on the unit so that the necessary controls are available to the operator in whatever position he may be, such as when connecting the unit to the aircraft plumbing connections. By this arrangement of controls and platforms for movement about the unit, he is able effectively and rapidly to service the aircraft lavatory waste storage tank.

The apparatus of this invention is elevator supported on the vehicle and has portions operably interconnected by fluid conduit means provided with an associated fluid pump for moving the water and water with detergent chemicals through the conduit system under pressure and directing these as selected by the operator into the aircraft waste receptacle in metered amounts. Pump energizing means are provided for electrically operating the pump which may be connected into the vehicle battery electrical system, or alternatively energizing means for the pump separate from the vehicle electrical system may be provided.

It will be appreciated that the fluid conduit system operably interconnecting the tank apparatus of the assembly can be provided with a fluid flow-direction control valve of the three-way type which includes a proportioning injector with the valve connected respectively in the conduits leading from the water tank and from the deodorant-detergent tank and connected into a conduit leading to the fluid pump so as to provide under semiautomatic control by the operator for selectively and sequentially passing fresh water or a charge of water containing sanitizing deodorant-detergent under pump pressure through a quantity measuring fluid flow meter and through a flushing and charging hose into the aircraft waste receptacle after or during emptying of its stored waste contents. A second directional control valve of the three-way type can be included in the system and the conduit from the pump led thereto so that the fresh water or the charge of chemicals mixed with the water can be selectively directed either into the aircraft waste receptacle for flushing or charging it with water and chemicals, or into the mobile unit waste receiving tank and sprayed onto interior walls thereof to cleanse it.

The system of this invention advantageously includes valve operating and condition indicating means operably associated with the fluid directing control valve means in the fluid conduits to provide for line-of-sight inspection and easy hand and automatic control of fluid flow conditions by the operator from a work station position at once positioned on the unit closely adjacent to the cleaning apparatus and the aircraft plumbing connections to its waste storage receptacle when the apparatus is in elevated position, and when the apparatus is in its lowered position, providing for dumping of the waste material which has been transferred into the waste receiving tank into a disposal system such as a sewer followed by rinsing and sanitizing the tank.

Dual pump operating control switches can be provided respectively adjacent to one or more operator control and servicing stations on the cleaning apparatus including adjacent the three-way valve indicator devices and meter so the operator can monitor the system operation and electrically energize the pump from a choice of servicing positions or stations. Advantageously also, the flow meter is provided with means for resetting its reading whereby the amount of flushing water or water and deodorant-detergent type sanitizing chemicals can be closely controlled and monitored by the operator on the apparatus while it is closely adjacent the aircraft plumbing connection panel.

Also, the system of fluid conduits system can be provided with suitable relief valve means installed in bypass piping around the pump to prevent delivery of excess pressure into the aircraft and automatic valve means can be provided in the conduit system and operably interconnected with the pump energizing system to provide for automatic drainback of fluid in the flushing and charging hose to the apparatus during cleaning operations when the pump is not energized.

The equipment forming the cleaning apparatus for the present system advantageously may be provided with a runningboard type of work station support at the rear or back of it for an operator to stand upon and which may form a part of a protective enclosure or body shell installed over the equipment with the shell upper surface and the runningboard provided with a nonskid top surface for personnel to stand upon while servicing the aircraft.

It is to be appreciated that important advantages are derived by mounting major components of the apparatus of the invention on a platform supported on a vehicle or automobile by an elevator or hoist attached thereto so as to provide for accurately positioning the cleaning apparatus and its controls and the operator into close proximity with the plumbing connections at the lavatory servicing connection panel on the aircraft.

The above and additional objects and advantages of the invention will become more apparent from attention to the annexed description and drawings of a preferred embodiment of the invention which it is to be understood are given only by way of illustration of the inventive concepts herein and not as limitative thereof and in which:

FIG. 1 is a side view in elevation of the lavatory servicing and sanitation unit of this invention showing the assembly of cleaning apparatus mounted on a vehicle together with an operator carried thereby in one servicing station position elevated into close proximity to the lavatory servicing connection panel of an aircraft, and in broken lines the position of the apparatus in the lowered position and the swivel arrangement of the standpipe and dump tube;

Figure 1:
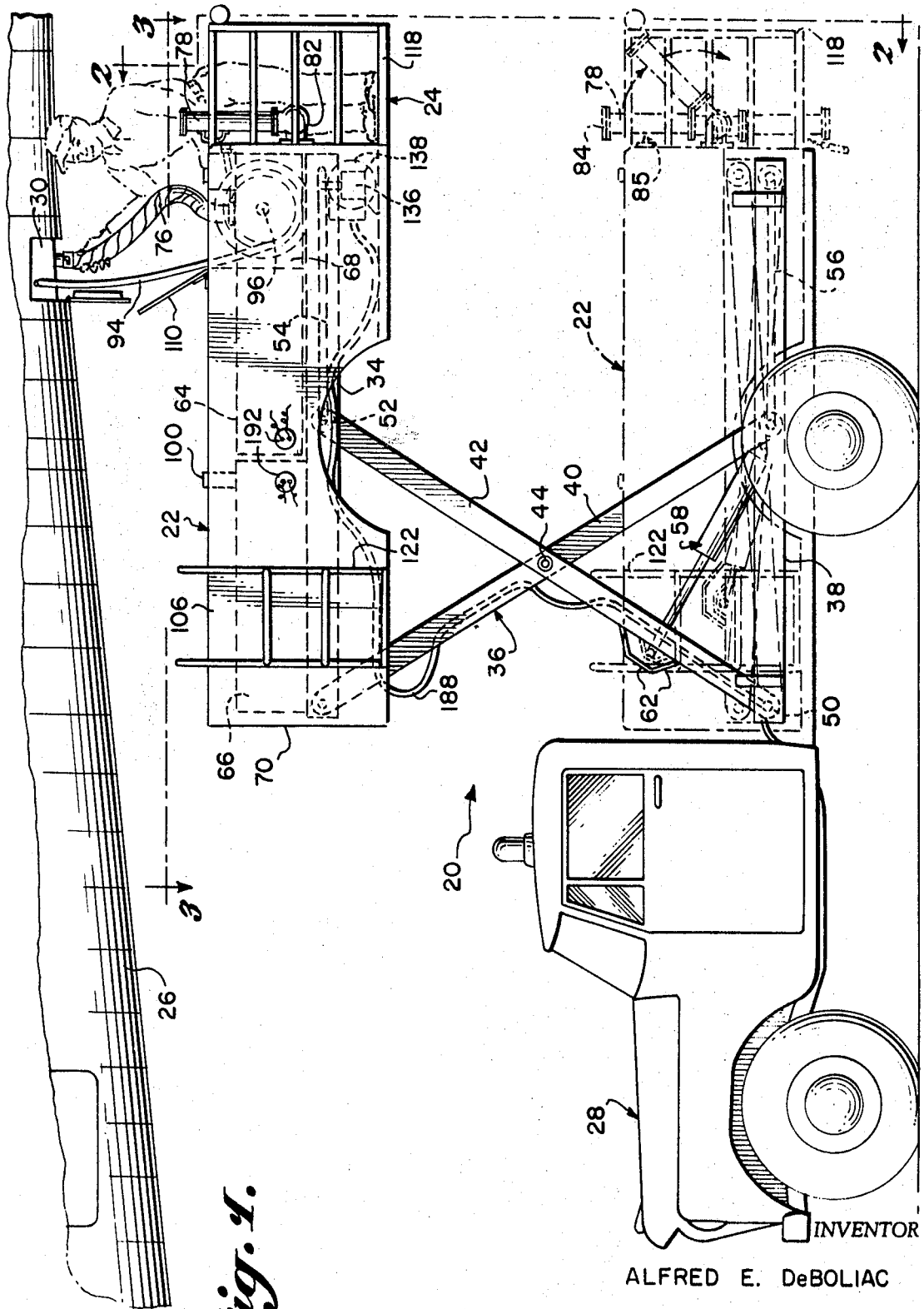

FIG. 4 is a schematic diagram of fluid carrying and controlling portions of the apparatus showing the tanks and their inlet and outlet connections, the flushing and charging pump, the three-way valves, solenoid valve, and their interconnecting fluid flow conduits; and FIG. 5 is a diagram showing the electrical controls for operating the pump and the fluid drainback solenoid valve with their connections to the vehicle battery.

Referring to the drawings, the high-lift aircraft lavatory servicing and sanitizing unit of this invention is designated generally by the numeral 20. It has a combined waste disposal and cleaning fluids storing and controlling assembly which makes up the waste removal and cleaning apparatus 22 and provides platform support for an operator 24 to service the portable lavatory waste storage tank or receptacle (not shown) installed aboard an aircraft 26. Apparatus 22 is mounted for mobility on a truck type vehicle 28. Solid lines are used to show the apparatus in its elevated or aircraft-servicing position immediately adjacent to the aircraft lavatory waste storage tank which has its plumbing or servicing connections through a connection panel 30. Broken lines are used to show the apparatus in its lowered, near the ground or waste transporting and disposal position close above the vehicle chassis.

The waste removal and cleaning apparatus 22 is supported on a rectangular platformlike base or flooring 34 forming part of a scissors type hoist or elevator device 36 horizontally supported on the vehicle having portions vertically positionable on it. Upper scissors portions of the assembly are connected to the flooring and lower portions of the scissors arranged for support from a rectangular subframe 38 installed on the vehicle chassis. The vehicle, elevator, and attached cleaning apparatus assembly thus form a high-lift unit for servicing aircraft lavatories which is both mobile and adapted to position to a substantial height closely adjacent the lavatory servicing connections of the aircraft the waste disposal and cleaning fluid storage and controlling equipment together with an aircraft servicing operator.

The elevator device 36 is arranged on the rear of the vehicle so as to support the cleaning apparatus below the vehicle cab rear window so as not to obstruct the driving view. The elevator device has a pair of rectangular inner and outer scissors frames 40 and 42 respectively forming a thrust member and a leveling member pivotally connected by a shaft 44. The shaft passes through a cross brace 46 joining side members of the inner scissors frame and has its ends journaled in bearings positioned in the side members of the outer scissors frame.

Figure 2:
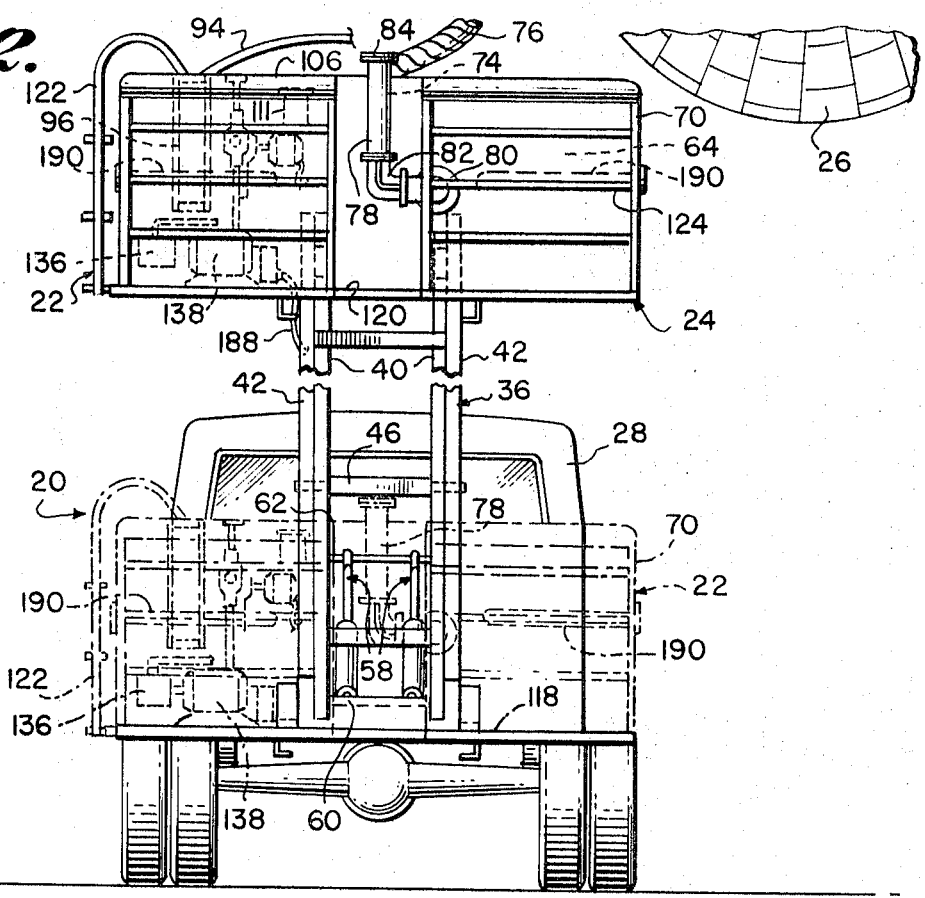
FIG. 2 is an end view in elevation of the unit of FIG. 1 taken on line 2–2 thereof.
Figure 3:
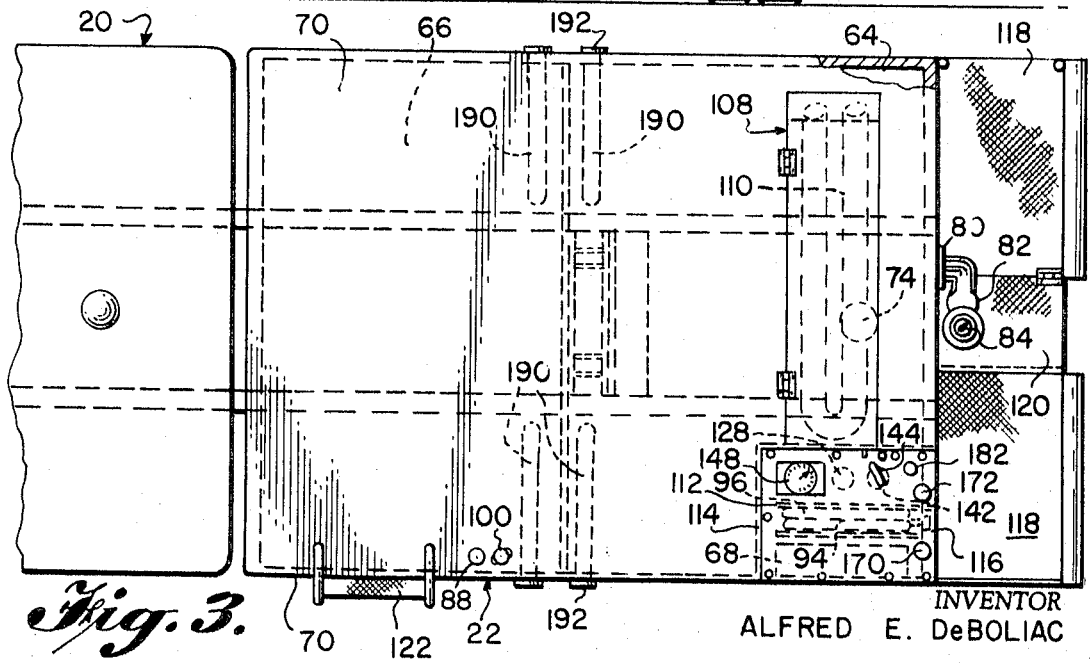
FIG. 3 is a top plan view of rear portions of the unit of FIG. 1 taken on line 3–3 thereof.

Outer scissors frame 42 has its forward end pivotally secured to a forward thrust header 50 attached across subframe 38 and at its other end is slidably pivoted on pivot pins 52 which can move in a pair of slots 54 defined in vertical side portions of floor girders supporting the flooring 34. Lower ends of the inner scissors frame 40 are pivotally slidable in slot guideways 56 defined through side members of the subframe and has its upper or forward end pivotally fixed to the forward end of the floor girders. The elevator can be raised and lowered to position the height of the cleaning apparatus and operator to best advantage by a pair of hydraulic cylinder and ram assemblies 58. The rear end of the cylinders are pivotally attached to a rear thrust head 60 mounted across the subframe and the forward or ram portions of the cylinder assemblies connected to a thrust header bar and brace device 62 attached across the inner scissors frame. Operator controllable means (not shown) are provided for hydraulically operating the cylinder and ram assemblies to selectively raise or lower the apparatus 22 and its operator between a lower position adjacent the vehicle chassis and selected elevated positions for servicing aircraft at different heights (see FIGS. 1 and 2).

The assembly forming the cleaning apparatus 22 includes a waste receiving tank 64 arranged in rearwardly down-tilted position and into which the refuse or waste from the aircraft lavatory is transferred, a flushing water tank 66, and a chemicals or deodorant-detergent tank 68 for containing the liquid sanitizing chemicals used in charging the aircraft lavatory waste receptacles or the waste receiving tank of the unit to clean and sanitize and deodorize them. The tanks are supported on the flooring 34 with their associated piping and equipment and the apparatus and flooring covered by a protective body shell 70.

The waste receiving tank 64 has a waste inlet 74 and is provided with a removable large bore waste transfer tube 76 having quick coupling fittings at its ends, one of which is connectable to a dump valve from the aircraft lavatory waste storage receptacle on connection panel 30 and the other to the inlet 74 to provide for gravity transfer of wastes from the aircraft lavatory waste storage tank into the receiving tank on the unit. The receiving tank also has a large bore combination standpipe and waste dumping tube 78 which is connected into the receiving tank outlet 80. The dumping tube is provided with a swivel joint dumping valve 82 so this tube can be swung in an arc between its vertically up position during transfer of wastes into the tank from the aircraft and a vertically downward position providing a dumping valve action for gravity dumping of waste from the tank 64 into a sewer at a disposal point (not shown). The dumping tube also has a removable cap 84 for covering its outlet end and is releasably secured to the shell 70 by a latch device 85.

The flushing water tank 66 has a water filling inlet 100, a water level indicator device 88, and a water tank outlet 90 which communicates through piping into a flushing and charging hose 94 through which either flushing water or a charge of water and chemicals is delivered into the aircraft. The hose is stored on a reel 96 and in use extended therefrom as required so its discharge end can be connected by a quick coupling fitting attached thereto into a flushing water inlet connection to the aircraft waste storage receptacle located on the aircraft plumbing connection panel during the cleaning operations.

The container or chemicals tank represented at 68 in the drawings for supplying the deodorant-detergent type sanitizing chemicals has chemical fluid outlet 102 for communicating by piping with the flushing and charging hose 94.

The protective shell 70 covering the tanks and its support flooring provides an enclosure housing the tanks 64, 66, and 68, their intercommunicating piping and the other waste removal and tank cleaning apparatus. The shell has an upper deck or top 106 spaced above the tanks a distance sufficient to accommodate a recessed box 108 having a hinged box cover 110 so the box is adapted to store the waste transfer tube 76 out of sight but convenient to the receiving tank when it is not in use as well as provide access to the waste receiving tank inlet 74 during servicing. Transfer tube 76 is clamped by its end fitting to a nipple connected to the waste receiving tank inlet and extending through the bottom of the box. Also, the box is sloped down and rearwardly to a drain 111 opening into the waste receiving tank and closed over by a counterweighted flapper valve (not shown) so waste water entering the box can drain to the receiving tank. The shell also houses a storage compartment 112 which contains the reel 96 with its hose 94 and has a compartment cover 114 provided with a hose port 116 through which the hose 94 can be reeled and unreeled. Also contained in the compartment are the controls, valves, pump and fluid flow meter. Each cover 110 and 114 forms a part of and closes flush with the upper surface of the shell to provide it with a substantially continuous upper deck when the covers are closed, and the top of the shell is adapted to support the operator thereby providing a work platform during servicing operations.

It can be seen further that the body shell below the upper deck has a lower deck extending outwardly at the rear of it as a horizontal bumper step or running board 118 which also serves as an operator support platform at a servicing and control station at the rear of the cleaning apparatus. The running board and substantially the entire top of the shell are provided with a nonslip tread for safety in standing and walking at various positions on the shell. The running board is centrally divided into left and right portions which define a gap between them into which the standpipe-dump tube is moved when downwardly directed for gravity dumping to a sewer. A hinged middeck 120 covers the gap between right and left portions to provide a walkway across the entire rear of the unit but which can be lifted out of the way when necessary to dump the receiving tank contents. Access to the platform is at the right rear. A ladder 122 provides assistance to the operator in moving about the apparatus and guard rails 124 are provided at the rear of the platform with those enclosing the left rear side of it useful as a ladder for reaching the top of the shell.

It will be understood that the various tanks already described are interconnected by a system of intercommunicating conduits or piping and provided with fluid and electrical control devices for controlling operation of the system and apparatus of the invention. Thus, water tank 66 has its outlet 90 communicating through a water outlet conduit 126 with one inlet port of fluid controlling three-way type water/water-chemicals charge valve 128 for supplying it with water. Port selection control of valve 128 is by its operating motor 129. A chemicals tank outlet conduit 130 connects between the chemicals tank fluid outlet 102 and an inlet port of the three-way water/water-chemicals charge valve for supplying the valve with degerming or sanitizing deodorant-detergent chemicals. The water/water-chemicals charge valve includes a controllable proportioning fluid injector which can be preset to deliver when so actuated a determinable quantity of the chemicals into the water flow from tank 66 to form a chemical solution or charge which is available to the pump or it can provide for delivery of only water to the pump as desired. The valve has a lever 132 which acts as an indicator-pointer for monitoring the direction of fluid flow selection. The operator by choosing between a pair of pump actuating control buttons can selectively cause either flushing water from the water tank or a charge of water with mixed-in deodorant-detergent from the chemicals tank to be passed by pump suction into the three-way valve, then into pump inlet conduit 134 connected between it and a pump 136, when the pump is energized by its motor 138. The selected water or chemical charge can be passed from the pump into a pump outlet conduit 140 communicating with a second fluid controlling three-way type aircraft/rinse valve 142 provided for directing the flushing water or chemicals as selected by the operator either to the aircraft or to the waste receiving tank. The aircraft/rinse valve has a hand-control lever 144 acting as a fluid flow direction indicating pointer for direction control and monitoring of the flow direction by the operator. One outlet port of valve 142 communicates through a meter inlet conduit 146 with the inlet of a fluid flow meter 148 which indicates total gallon output of the pump and which is hand-resettable by a reset button 150 for operator control of its setting and for sight-monitoring of the quantity of either flushing water or chemical charge passed during servicing operations. A meter outlet conduit 152 connects between the meter and the hose 94 for delivery therethrough and into the lavatory waste storage receptacle or tank via its connection panel 30 of chemicals and/or water when the control lever 144 is positioned to "aircraft." Valve 142 also has a second outlet port communicating through a rinse conduit 156 with a spray head and piping assembly 158 positioned in the waste receiving tank 64 with the spray heads arranged to direct rinse water or solution into interior walls of the tank to rinse and cleanse it.

The cleaning apparatus also has a normally open solenoid valve 162 positioned for automatic control of fluid flow in a drainback conduit 164 which connects between the inlet to the hose 94 and the conduit 126 leading into the water/charge valve 128. The solenoid valve is electrically connected with the pump motor to close during operation of the pump and open when pump operation stops so as to provide an open pathway for an automatic runback of fluid in the hose so it can drain back into the apparatus to the water tank 66 to clear the hose preparatory to storing it away in the hose reel storage container after it is disconnected from the aircraft (see FIG. 4).

An electrically interconnected set of pump control switches 170 and 172 are positioned in cover 114 at the rear ends of the shell 70 covering the apparatus which allows the operator to energize the fluid pump through a relay device 174 and in the case of switch 172 additionally through a relay 175 in control of the electric motor 129 which operates valve 128, and this can be done from the various servicing positions on and at the rear of the shell. Electrical energy for operation of the pump is supplied from the vehicle 12-volt battery 176 which is connected through a relay 178 providing for nonoperation of the system when the transmission of the vehicle is not in neutral position. The battery supplies power for the solenoid valve 162 (see FIG. 5). (see FIG. 5).

An elevator power control switch device 182 for operating the elevator assembly through its control system (not shown) is also provided in the apparatus shell 70 to provide for the servicing operator on the shell to raise and lower the apparatus to the most expeditious servicing height at any time during the servicing operations.

A waste removal and cleaning apparatus suitable for highlift servicing operations as described herein has been found to include a waste receiving tank having a capacity of from about 400 to about 420 liquid gallons; a flushing water tank of a capacity from about 240 to about 260 liquid gallons, and a chemicals tank having a capacity of from about 2 to about 3 liquid gallons for respectively holding the waste and the cleaning liquids. Satisfactory operation of the apparatus is achieved when piping or conduit sizes and the pump and its motor have a capacity sufficient to deliver 25 g.p.m. at 50 p.s.i.g. ± 5 at the outlet end of the flushing and charging hose. Suitable connecting piping conduits for attaching the cleaning apparatus to the aircraft for servicing of it have been found to be a flexible flushing and charging hose which is about 1 inch inside diameter and about 12 feet in length, and for the waste transfer or refuse tube, a noncollapsible flexible conduit about 4 inches inside diameter and about 8 feet in length.

The tanks are preferably constructed of stainless steel and their intercommunicating piping formed preferably of brass or copper. Also, the pump, flushing and charging hose, hose reel, refuse tube, and all associated piping with controls for the cleaning apparatus are contained in the body shell with a power transmitting wiring umbilical 188 leading therefrom to the vehicle battery for supplying power to the pump and carrying power for operation of the elevator by the operator when on the cleaning apparatus.

For operation during winter months, the tanks are desirably provided with submerged internal heaters 190, each having an external power connection 192 for attachment to an external source of electrical power (not shown).

In operation of the system, with the vehicle in its proper functioning condition and the standpipe-dump tube latched in its up position, the flushing tank and chemicals tank are respectively filled to the proper level with fresh water and deodorant-detergent sanitizing chemicals and the unit driven by the operator to the aircraft to be serviced and positioned by sighting through the vehicle cab rear window to place the cleaning apparatus in the most convenient position below the aircraft lavatory servicing or connection panel 30. The operator places the transmission switch in neutral and climbs onto the runningboard 118 where he actuates the elevator power control switch device to lift himself and the cleaning apparatus into close reach of the panel 30. It will be appreciated the operator may work from its top deck or the rear step platform runningboard After opening the cover 110, of box 108, the operator connects the waste transfer tube 76 to the aircraft dump valve (not shown) on the connection panel. The flushing and charging hose is similarly connected at the panel to the aircraft waste storage receptacle charging valve (not shown). The operator hand sets three-way fluid control valve 142 using handle 144 to "aircraft" and sets the meter reading to zero position by knob 150 and by viewing the meter dial face through a clear plastic window set in the cover 114 above the meter. The aircraft dump valve (not shown) at the connection panel is then opened to allow gravity draining of waste material through tube 76 into the waste receiving tank 64. The operator then depresses the operating button for control switch 170 which energizes the pump 136 and allows valve motor 129 to place valve 128 in condition for passing through it water only from tank 66, and simultaneously causes solenoid valve 162 to close. This action causes flushing water to be delivered through hose 94 into the aircraft waste storage receptacle or tank to scavenge it and the flushed out material passes by gravity through tube 76 into tank 64. Release of the control switch 170 stops pump operation and solenoid valve 162 opens and allows flushing water in the hose 94 to drain back through drainback conduit 164 and solenoid valve 162 into the flushing water tank.

The operator then depresses the other pump control switch 172 which acts both to operate the pump and to close solenoid valve 162 through relay device 174, and through relay 175 to cause valve motor 129 to place valve 128 in condition to pass water from tank 66 and cause the proportioning injector in the valve 128 to supply sanitizing chemicals from tank outlet 102 into the flow of flushing water, and this water-chemical solution is charge into the lavatory waste receptacle aboard the aircraft to freshen it, and all or a portion of the charge can be left in the receptacle by first closing the dump valve at the aircraft connection panel. The operator releases pump switch 172 when sufficient chemicals solution or charge has been passed to the aircraft. Drainback of liquid in the flushing and charging hose then occurs as before.

Following charging of the water and chemicals solution into the aircraft, the operator stows the hose 94 on its reel places valve 142 to "rinse" position using hand control lever 144.

With the charging and the dumping valves on panel 30 closed and the flushing and charging hose 94 and the waste transfer tube disconnected therefrom, the operator actuates switch device 182 causing the elevator to be lowered by action of the hydraulic cylinder and ram assembly. The cleaning apparatus is thus placed again close above the rear of the vehicle chassis and the operator drives the vehicle to a point of refuse disposal, for example to a sewer connection. Arriving there, the operator swings the middeck section of the rear platform out of the way and uncaps and unlatches standpipe-dump tube 78 from its catch to the shell and swivels the dump tube to a down position (see FIG. 1) over the sewer, opening dump valve at tank 64 whereby gravity dumping of the contents of the waste receiving tank into the sewer will occur. The operator then depresses one of the pump switches 170 causing delivery of water from the flushing water tank into waste receiving tank 64 to rinse and scavenge it. If desired, the operator can then depress the other pump switch 172 which again operates the pump and causes a charge of deodorant-detergent chemicals to be supplied with the water flow into the waste receiving tank to further freshen it. Following dumping, the standpipe and waste dumping tube 78 is returned to its "up" position, the waste transfer tube placed in its box, and covers on the shell closed. The unit is then ready for servicing an additional aircraft. If desired, the vehicle may be driven to a wash station where any portion of the entire unit may be hosed down with water and/or chemicals to clean the outside of it if necessary, or the water with or without in the apparatus can be used for this purpose by hosing down through use of hose 94 and the desired pump control switches.

In lieu of providing the three-way valve 128 which includes a proportioning injector in it for mixing chemicals into the flushing water, such valve and the conduit supplying chemicals to it from the chemicals tank can be deleted and the conduit leading from the water tank led direct to the pump inlet. A separate, liquid proportioning injector valve, which is electrically controllable through relay 175 in the same manner as was valve 128, can be inserted into either the portion of the water conduit leading to the pump inlet or into the portion leading from the pump outlet and a fluid supply conduit connected between the chemicals tank and the injector valve for chemicals to be directed thereby into the water flow. This injector valve would preferably be open to water flow-through at all times but be normally closed to induction through it of chemicals into the water flow except on closing of pump switch 172. This switch when selected and operated, would then act both to operate the water pump and through relay 175 to open flow passage for inductor injection of chemicals through the valve for mixing into the water flowing in the conduit.

It will be appreciated that controls for the hydraulic system elevating the apparatus can be provided on the apparatus within reach of the servicing operator for one-man operation of the entire unit, or an additional set of controls can be provided if desired in the vehicle cab to permit operation by two or more personnel, one on the cleaning apparatus and another stationed in the vehicle cab.

It will also be appreciated that various runningboard type operator stations may be built onto the shell or can be attached to the lift platform or flooring supporting the cleaning apparatus for raising the operator into servicing position adjacent the apparatus on the aircraft. Also, the tanks can be constructed as one unit appropriately divided into compartments for accomplishing the functions described above and can also be provided with all necessary sump type cleanout drains and inspection and repair manholes. Preferably, the chemicals tank is a bank of a pair of prefilled chemicals containers connected in parallel with suitable conduits and valving for freely switching from one to the other so that a filled container may be substituted for an empty one without interruption of the immediate operating availability of the apparatus.

It will also be within the contemplation of this invention to provide the source of electrical power for the operation of the pump on the cleaning apparatus instead of using power from the vehicle battery.

It will be understood that various changes and modifications to the invention may be made, all falling within the scope of the inventive concepts herein.

I claim:

1. A mobile unit for positioning a waste removal and cleaning apparatus so that waste can be removed from an aircraft lavatory waste storage receptacle and the receptacle cleaned after waste removal in a continuous operation which comprises a mobile vehicle; an elevator base operably positioned on said vehicle and adapted to be raised and lowered in relationship thereto; a waste removal and cleaning apparatus means positioned on said elevator base having a waste receiving tank means for retaining waste removed from said lavatory waste storage receptacle, a cleaning liquid holding tank means for supplying cleaning liquid to the evacuated lavatory waste storage receptacle, a first conduit means operably connected to said waste receiving tank at one end and having at its other end a connector means adapted to be attached to an outlet means of said lavatory waste storage receptacle positioned in said aircraft, a second conduit means operably connected to said cleaning liquid holding tank means at one end and having at its other end a connector means adapted to be attached to an inlet of said lavatory waste storage receptacle positioned in said aircraft, pump means operably connected to said second conduit means for moving cleaning liquid from said cleaning liquid holding tank into said receptacle in said aircraft to flush it after waste has been removed; platform means positioned on said elevator base for supporting an operator; and control system means on said waste removal and cleaning apparatus for raising the device to position it for waste removal and cleaning of said receptacle, for operating said pump means during cleaning of said receptacle, and for lowering the apparatus after cleaning has been completed.

2. The mobile unit of claim 1 in which a plurality of cleaning liquid holding tanks are provided in said apparatus, one of said tanks adapted to contain a supply of flushing water and another adapted to contain a supply of liquid chemicals so as to provide for cleaning and sanitizing the receptacle.

3. The mobile unit of claim 2 in which a proportioning means is provided to regulate the amount of water to chemicals supplied in the receptacle.

4. The mobile unit of claim 2 in which said liquid chemicals when used are conveyed into the flow of water after removal from the water tank and before entry into said receptacle.

5. The mobile unit of claim 4 in which a proportioning injector means regulates the amount of liquid chemicals injected into the flow of water from the flushing water tank.

6. The mobile unit of claim 2 in which said plurality of cleaning liquid holding tanks are connected to said second conduit through a three-way control valve positioned therein to provide for selectivity among said cleaning liquid holding tanks so as to direct liquid from one tank or a mixture from two tanks through the said second conduit means into the aircraft lavatory waste storage receptacle.

7. The mobile unit of claim 6 in which the second conduit means has a second three-way control valve connected therein downstream of said first three-way control valve and a third conduit means operably connecting said second three-way control valve and the waste receiving tank so that the said first three-way control valve can be set to select liquid from one of or two of said cleaning liquid holding tanks and the second three-way control valve selectively set to direct the flow of liquid either to the lavatory waste storage receptacle or the waste receiving tank.

8. The mobile unit of claim 1 in which a liquid flow meter is positioned in said second conduit, said meter having a resettable quantity-gaging dial so that the amount of cleaning liquid pumped from said cleaning liquid holding tank can be sight-measured and controlled during the cleaning of the lavatory waste storage receptacle.

9. The mobile unit of claim 1 in which said second conduit has a bypass return conduit in it for returning cleaning liquid to said holding tank after the desired amount of liquid has been pumped into said receptacle, said bypass return conduit having a solenoid operated valve in it responsive to the operation of said pump means so that when the pump means is in operation, the valve is closed, and when the pump means has stopped, the valve is open to return cleaning liquid to the holding tank, thus preventing spillage of the liquid on disconnecting said second conduit from the inlet to said lavatory waste storage receptacle.

10. The mobile unit of claim 1 in which said waste receiving tank has operably connected thereto a dumping valve positioned in the bottom portion thereof for gravity discharging waste from said tank.

11. The mobile unit of claim 10 in which said dumping valve is a swivel joint valve positioned in an elongated dumping tube operably connected to the bottom of said tank so that when the dumping tube is in an upright position, the swivel joint valve is closed, and when the dumping tube is downwardly extended, the swivel joint valve is open for dumping waste through said tube.

12. The mobile unit of claim 1 in which said first and second conduits have flexible end portions for making connections with the outlet means and inlet means, respectively, of said lavatory waste storage receptacle.